Feb. 8, 1949.  R. ELY  2,461,044
MUD OR SPLASH SHIELD FOR VEHICLES
Filed Sept. 18, 1945

INVENTOR.
ROBERT ELY
BY A. B. Bowman
ATTORNEY

Patented Feb. 8, 1949

2,461,044

UNITED STATES PATENT OFFICE 2,461,044

MUD OR SPLASH SHIELD FOR VEHICLES

Robert Ely, San Diego, Calif.

Application September 18, 1945, Serial No. 617,047

3 Claims. (Cl. 280—154.5)

My invention relates to a mud or splash guard for vehicles and the objects of my invention are:

First, to provide a mud or splash guard of this class which is supported by the wheel axle and not the vehicle body and therefore has a constant and correct horizontal relationship with the wheel of the vehicle concerned and does not raise and lower with the action of the spring.

Second, to provide a mud or splash guard which is simple to install on a vehicle without making any alterations therein.

Third, to provide a device of this character which is very simple and easily adjustable to meet varying conditions and various vehicles.

Fourth, to provide a device of this character which effectively prevents mud or gravel from being thrown upwardly and to the rear of the wheels of the vehicle.

Fifth, to provide a device of this character which is inexpensive and practicable to manufacture, and completely efficient in use.

Figure 1:
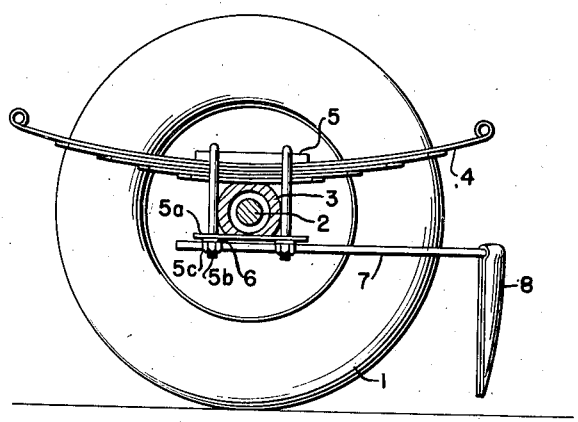
Figure 2:
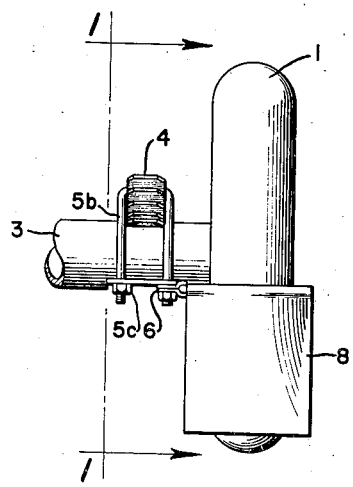
Figure 3:
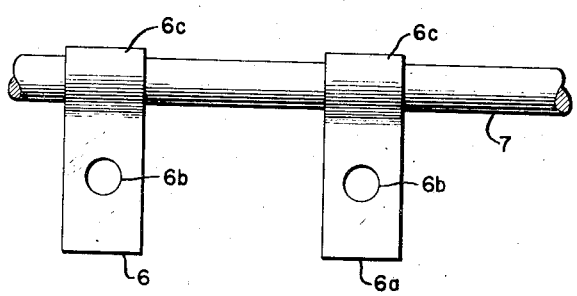

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Fig. 1 is a vertical sectional view of my invention secured to the U bolts associated with the suspension spring and axle of a vehicle, the relative position of the wheel and the guard being indicated, the view being taken from the line 1—1 in Fig. 2; Fig. 2 is an end elevational view of the structure shown in Fig. 1; Fig. 3 a detail fragmentary view of a portion of the supporting arm and the clamps used to secure the same to the U bolts.

Similar characters of reference refer to similar or identical parts and portions throughout the several views.

The wheel 1, axle 2, axle housing 3, suspension spring 4, U bolts 5b, clamps 6, arm 7 and guard 8 constitute the principal parts and portions of my invention.

The wheel 1 will normally be on the rear axle 2 of the vehicle and my invention is peculiarly adapted to high speed vehicles such as trucks and passenger cars equipped with pneumatic tires. The axle housing 3 is clamped in underslung relation to the multiple leaf spring 4 in many constructions as illustrated in the drawings by means of the plate 5 above the center portion of the leaf spring 4, the plate 5a beneath the housing 3 and U bolts 5b and nuts 5c all as illustrated.

My invention envisages the combination with these U bolts 5b of simple clamps 6 and 6a fashioned from flat stock with holes 6b to allow the insertion of the bolts 5b and curved portions 6c to grasp the arm 7. These clamps must be adapted to firmly hold the arm 7 against rotation or longitudinal movement thereof when the nuts 5c are tightened. The arm 7 may be of cylindrical stock and a portion thereof, at the free or unattached end disposed towards the rear of the vehicle, is bent normal to the main length for the attachment thereto of the flap 8. This guard or flap 8 comprises a generally rectangular flap of relatively heavy resilient or flexible material with a channel formed therein across the top edge thereof to accommodate the arm 7 to which it is firmly fastened in any suitable manner such as by riveting.

In use my invention will ordinarily be secured to the U bolts 5b at both sides of the rear axle of the vehicle wherewith it is to be used and the clamps 6 will firmly hold the arm 7 in such position that the guard 8 will depend from a height approximating the height of the axle downwardly close to the ground and immediately behind the wheel 1.

Gravel or mud impelled to the rear of the vehicle by the natural slippage of the rear wheels when power is applied thereto will then be deflected and prevented from rising behind the vehicle into the path of any following vehicle.

Though I have shown and described a particular construction, combination and arrangement of parts and portions, I do not wish to be limited to the particular construction, combination and arrangement but desire to include in the scope of my invention, the construction, combination and arrangement substantially as set forth in the appended claims.

Having thus described my invention, what I claim as new and desire to secure by Letters Patent is:

1. In a splash guard securable to the suspension spring on the axle housing of a vehicle, the combination of an arm extending along the side of the vehicle wheel with an end portion bent substantially at a right angle to the remainder thereof in a horizontal plane, a flap of flexible material affixed to and depending from said end portion, said end portion being curved and said flap being concave-convex in transverse section behind the vehicle wheel, and strap clamps folded around said arm and having bolt holes extending through opposite ends thereof adapted to rigidly clamp said arm to the wheel axle housing structure of said vehicle associated with said suspension spring.

2. In combination with the spring and axle housing of a motor vehicle, of spring connecting U bolts, an arm extending backwardly along the side of the vehicle wheel from said spring connecting U bolts, strap clamps folded around said arm and having bolt holes extending through opposite ends thereof to rigidly fasten said arm to said bolts, and a flap of flexible material affixed to and depending from the free end of said arm at the back side of the wheel.

3. In combination with the spring and spring shackle of a motor vehicle, of spring U bolts, an arm extending backwardly along the side of the vehicle wheel from said spring U bolts, strap clamps folded around said arm and having bolt holes extending through opposite ends thereof to rigidly fasten said arm to said bolts, and a flap of flexible material affixed to and depending from the free end of said arm, the free end of said arm being bent so that said flap secured thereto is concave-convex in transverse vertical section on a plane parallel to the axle of said vehicle.

ROBERT ELY.

REFERENCES CITED

The following references are of record in the file of this patent:

UNITED STATES PATENTS

| Number | Name | Date |
| --- | --- | --- |
| 2,038,234 | Olen | Apr. 21, 1936 |

FOREIGN PATENTS

| Number | Country | Date |
| --- | --- | --- |
| 369,184 | Great Britain | Sept. 9, 1930 |
| 463,695 | France | Dec. 24, 1913 |